3,036,089
DIACETYLENE COMPLEX

Norman Shachat, Levittown, Pa., assignor to Rohm & Haas Company, Philadelphia, Pa., a corporation of Delaware
No Drawing. Filed Nov. 15, 1960, Ser. No. 69,281
6 Claims. (Cl. 260—326.5)

This invention concerns an equimolecular complex of 1,3-butadiyne, commonly called diacetylene, and N-methyl-2-pyrrolidinone, a method for its preparation, and a method for concentrating diacetylene from gases containing diacetylene.

In the production of acetylene by the arc process, there is formed a minor, but important, proportion of diacetylene. Ordinarily such diacetylene is not recovered. In some methods of forming acetylene involving combustion of hydrocarbon gases at high temperatures, there are small amounts of diacetylene formed. While various methods for isolating acetylene and/or removing impurities from the crude acetylene-containing gases have been proposed, such as scrubbing with oil, treating with sulfuric acid, low temperature fractional condensing, mild hydrogenating, and absorbing and stripping acetylene from a solvent, none of these methods has provided a way of recovering relatively pure diacetylene. The absorption methods of the art do not provide a means for isolating diacetylene from crude gases. Yet it would be desirable to have a way of collecting and making available by-product diacetylene, since it is also a useful compound. Furthermore, in reactions in which diacetylene is obtained as a major product, it is desirable to have a method and means available for recovering, purifying, stripping, and storing the diacetylene.

It has been discovered that diacetylene reacts with N-methyl-2-pyyrolidinone when the concentration of diacetylene is sufficiently high to form a solid complex consisting of one molecular proportion of diacetylene and one molecular proportion of N-methyl-2-pyrrolidinone.

The complex precipitates as a solid from 2-methyl-2-pyrrolidinone when diacetylene is dissolved in the N-methyl-2-pyrrolidinone below 27° C. in excess of the amount of diacetylene needed to saturate the solution at any given temperature. This relationship is approximately expressed by the following equation $[T=12M-35]$. T is ° C. and M is molality at saturation. (A one molal solution contains one gram mole of substance in 1000 grams of solvent.) It is to be understood that this equation is not exact as molality is not precisely proportional to temperature, but the equation is sufficiently close to define the quantity of diacetylene which must be supplied to provide formation of the desired solid complex at any given temperature. The more precise data are given in Table I.

There is no evidence of any complex formation until solid actually separates. Thus, a solution of diacetylene up to saturation in N-methyl-2-pyrrolidinone shows no evidence of complex formation in its infrared absorption spectrum. Thus, in the absorption of acetylene gases containing small amounts of diacetylene followed by the desorption of acetylene therefrom there is no complex formed.

Formation of the solid complex requires, first, that the solution of diacetylene is below 27° C. and, second, that diacetylene be supplied until the molality defined by the above equation be at least met at any given temperature below 27° C. Absorption of diacetylene may be desirably effected at superatmospheric pressures.

When gas having diacetylene as one of the several components is used, the gas is passed through N-methyl-2-pyrrolidinone until the required minimum molality of diacetylene is reached. Complex then separates as a solid. This may be removed, as by filtering; the liquid is then further treated with the gas. The process can be made continuous.

This process may be defined as one of mixing diacetylene and N-methyl-2-pyrrolidinone, suplying diacetylene while the complex forms as a solid, and separating said solid. When diacetylene is then desired, the solid complex is decomposed, as by heating, desirably at 30° to 50° C., or diacetylene is evolved from the solid under reduced pressure, or both heating and reducing of pressure may be used.

The complex is a solid which melts at about 26–27° C. The solid complex is stable when stored under a solution of diacetylene in N-methyl-2-pyrrolidinone or under an atmosphere of diacetylene below about 27° C. at normal or increased pressure.

The formation of the complex is conveniently demonstrated by dissolving diacetylene in N-methyl-2-pyrrolidinone and cooling the solution. A solid complex precipitates out below about 26–27° C. For example, a 4.85 molal solution of diacetylene was prepared in N-methyl-2-pyrrolidinone at room temperature. The diacetylene was synthesized by treating 1,4-dichloro-2-butyne with sodium hydroxide solution. The temperature of the solution was gradually reduced, being held at each level long enough to establish equilibrium. The solid complex of diacetylene and N-methyl-2-pyrrolidinone settled to the bottom and a sample of supernatant liquid was withdrawn at each temperature level and analysed for its diacetylene content. The data presented in Table I were obtained.

TABLE I

*Complex Formation*

| Temperature, ° C. | Molality of Supernatant Liquid | Percent $C_4H_2$ Precipitated |
|---|---|---|
| 26.0 | 4.85 | 0.0 |
| 19.0 | 4.61 | 9.0 |
| 15.0 | 4.00 | 29.0 |
| 9.5 | 3.51 | 42.0 |
| 2.0 | 2.85 | 58.6 |
| −10.0 | 2.8 | 70.7 |

Samples of the precipitated solid complex were taken and analyzed. The analyses all approached the mole ratio of 1:1. A sample of complex wet with N-methyl-2-pyrrolidinone was heated to 33.5° C. and the mixture was then cooled with stirring. When the thermometer in the mixture indicated 26° C. the first crystals appeared. At this point, the temperature of the mixture rose to 27.5° C. due to the heat of formation of the complex. As the temperature was lowered, additional solid precipitated. Formation of the complex appears specific to N-methyl-2-pyrrolidinone, for 2-pyrrolidinone itself, N-ethyl-2-pyrrolidinone, and other similar compounds gave no evidence of complex formation.

To demonstrate the feasibility of using the complex for acetylenic gases, a mixture with known proportions of acetylene, diacetylene, and methyl acetylene was prepared. This was passed through N-methyl-2-pyrrolidinone held at about 0° C. Crystals of a solid complex appeared in the liquid after a short time. The gas supplied had the following molar composition: acetylene, 38.40%; methyl acetylene, 16.43%; and diacetylene, 45.17%. The gas leaving the cooled N-methyl-pyrrolidinone when the first crystals of complex formed had the following composition: acetylene, 55.68%; methyl acetylene, 42.23%; and diacetylene, 2.09%. A sample of the solid complex, slightly wet with supernatant liquid, was taken from the vessel and warmed to about 40° C. Gas was evolved consisting of: acetylene, 0.16%; methyl acetylene, 3.71%, and diacetylene, 96.13%.

Reabsorption of the gas from the solid complex in N-methyl-2-pyrrolidinone, separation of the solid, and warming of the solid gives a gas of essentially pure diacetylene.

The complex may be heated, desirably at 30°–50° C., to evolve diacetylene. The diacetylene may be evolved under normal or reduced or increased pressure.

Diacetylene is a known compound which is of considerable interest as a chemical intermediate. For example, it may be reacted under the influence of an alkali metal alcoholate to give a 1-alkoxy-1-butene-3-yne which may be hydrolized with acid to triacetylbenzene which in turn may be oxidized to trimesic acid, the esters of which are useful as plasticizers. When triacetylbenzene is reduced it gives a trishydroxyethyl derivative from which a trivinylbenzene may be prepared, a useful cross-linking agent in addition polymerization.

This application is a continuation in part of my application Serial No. 790,050, filed January 30, 1959, now abandoned.

I claim:

1. The equimolecular complex of diacetylene and N-methyl-2-pyrrolidinone produced by the process which comprises mixing diacetylene and N-methyl-2-pyrrolidinone at temperatures between about 27° C. and −24° C. and supplying diacetylene until said complex is formed as a solid, and separating said solid.

2. A process for preparing a solid complex of diacetylene and N-methyl-2-pyrrolidinone which comprises mixing diacetylene and N-methyl-2-pyrrolidinone at temperatures between about 27° C. and −24° C. and supplying diacetylene until said complex is formed as a solid, and separating said solid.

3. A process according to claim 2 in which the mixing of diacetylene and N-methyl-2-pyrrolidinone is conducted under superatmospheric pressure.

4. A process for isolating diacetylene which comprises mixing a gas containing diacetylene with N-methyl-2-pyrrolidinone between about 27° and −24° C., supplying sufficient of said gas to form as a solid an equimolecular complex of diacetylene and N-methyl-2-pyrrolidinone, separating said solid from the N-methyl-2-pyrrolidinone, decomposing the separated solid by heating, and taking off diacetylene gas.

5. A process for isolating and purifying diacetylene which comprises contacting N-methyl-2-pyrrolidinone with gas containing diacetylene at a temperature between 27° and −24° C., supplying sufficient diacetylene to form an equimolecular complex of diacetylene and N-methyl-2-pyrrolidinone as a solid, separating said solid from N-methyl-2-pyrrolidinone, evolving diacetylene from the separated solid by heating said solid at 30° to 50° C. and collecting the diacetylene.

6. A process according to claim 5 in which the collected diacetylene is reabsorbed in N-methyl-2-pyrrolidinone at a temperature between 27° C. and −24° C., sufficient of this diacetylene is supplied to form an equimolecular complex of diacetylene and N-methyl-2-pyrrolidinone as a solid, the said solid is separated, and diacetylene evolved therefrom.

References Cited in the file of this patent

UNITED STATES PATENTS 2,846,443    Malusa et al. _____ Aug. 5, 1958